(12) United States Patent
Dell et al.

(10) Patent No.: US 10,234,136 B2
(45) Date of Patent: *Mar. 19, 2019

(54) EVAPORATOR BURNER FOR A MOBILE HEATING UNIT OPERATED USING LIQUID FUEL

(71) Applicant: WEBASTO SE, Stockdorf (DE)

(72) Inventors: Vitali Dell, Stockdorf (DE); Klaus Moesl, Stockdorf (DE); Stefan Sommerer, Stockdorf (DE); Thomas Kerscher, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 162 days.

This patent is subject to a terminal disclaimer.

(21) Appl. No.: 15/127,330

(22) PCT Filed: Mar. 11, 2015

(86) PCT No.: PCT/DE2015/100102
§ 371 (c)(1),
(2) Date: Sep. 19, 2016

(87) PCT Pub. No.: WO2015/139686
PCT Pub. Date: Sep. 24, 2015

(65) Prior Publication Data
US 2018/0172269 A1 Jun. 21, 2018

(30) Foreign Application Priority Data
Mar. 20, 2014 (DE) .......... 10 2014 103 817

(51) Int. Cl.
*F23D 3/40* (2006.01)
*F23C 7/00* (2006.01)
(Continued)

(52) U.S. Cl.
CPC .............. *F23D 3/40* (2013.01); *B60H 1/2203* (2013.01); *F23C 7/004* (2013.01); *F23C 9/006* (2013.01);
(Continued)

(58) Field of Classification Search
CPC .. F23D 5/123; F23D 3/40; F23D 2900/05002; F23D 2900/14241;
(Continued)

(56) References Cited

U.S. PATENT DOCUMENTS

| 1,341,478 A | | 5/1920 | Platt et al. | |
|---|---|---|---|---|
| 1,604,003 A | * | 10/1926 | Ward | F23D 5/02 431/330 |

(Continued)

FOREIGN PATENT DOCUMENTS

| CN | 200989585 Y | 12/2007 |
|---|---|---|
| CN | 101280922 A | 10/2008 |

(Continued)

OTHER PUBLICATIONS

"DE_4304057_A1—Machine Translation.pdf", machine translation, EPO.org, Jun. 13, 2018.*

(Continued)

*Primary Examiner* — Gregory Huson
*Assistant Examiner* — Daniel E Namay
(74) *Attorney, Agent, or Firm* — Quarles & Brady LLP

(57) ABSTRACT

An evaporator burner (100) for a mobile heating unit which is operated using liquid fuel is provided, said evaporator burner having: a mixture preparation region (2) for the mixing of fuel with combustion air to form a fuel-air mixture; a fuel feed (1) for feeding liquid fuel to the mixture preparation region (2); a combustion air feed (B) for feeding combustion air to the mixture preparation region (2); at least one evaporation surface (8) to which the liquid fuel is fed (Continued)

and which serves for the evaporation of the liquid fuel; a conversion region (3), positioned downstream of the mixture preparation region (2) in terms of flow, for the conversion of the fuel-air mixture into combustion exhaust gases (A) with a release of heat; and an exhaust-gas recirculation means (10; 210) for the recirculation of combustion exhaust gases (A) into the mixture preparation region (2).

11 Claims, 8 Drawing Sheets

(51) Int. Cl.
*F23C 9/00* (2006.01)
*F23D 5/12* (2006.01)
*F23D 5/04* (2006.01)
*B60H 1/22* (2006.01)

(52) U.S. Cl.
CPC ............... *F23D 5/04* (2013.01); *F23D 5/123* (2013.01); *B60H 2001/2271* (2013.01); *F23D 2900/05002* (2013.01); *F23D 2900/14241* (2013.01); *F23D 2900/21002* (2013.01)

(58) Field of Classification Search
CPC ........ F23D 2900/21002; B60H 1/2203; B60H 2001/2271; F23C 7/004; F23C 9/006
USPC ................................... 237/12.3 C; 431/9, 115
See application file for complete search history.

(56) References Cited

U.S. PATENT DOCUMENTS

| | | | |
|---|---|---|---|
| 2,373,757 A | 4/1945 | Hart | |
| 2,560,074 A * | 7/1951 | Bloomer | F23D 11/00 110/182.5 |
| 3,007,310 A * | 11/1961 | Eisele | F23R 3/12 431/115 |
| 3,531,229 A | 4/1969 | Berglund | |
| 3,502,268 A * | 3/1970 | Miskulin | B60H 1/20 237/12.3 C |
| 4,004,875 A * | 1/1977 | Zink | F23C 7/00 431/116 |
| 4,098,567 A * | 7/1978 | Hubbert | F23C 13/00 431/115 |
| 4,703,888 A * | 11/1987 | Kawamura | B60H 1/2203 126/110 C |
| 5,082,175 A | 1/1992 | Koch et al. | |
| 5,090,896 A * | 2/1992 | Kenner | F23D 11/441 126/110 B |
| 5,350,293 A * | 9/1994 | Khinkis | F23C 6/045 431/116 |
| 5,359,966 A * | 11/1994 | Jensen | F23C 3/006 122/17.1 |
| 5,616,021 A | 4/1997 | Onimaru et al. | |
| 5,947,717 A * | 9/1999 | Steiner | B60H 1/2203 126/116 R |
| 5,993,197 A | 11/1999 | Alber et al. | |
| 6,027,334 A * | 2/2000 | Blaschke | F01N 3/0256 126/116 R |
| 7,762,807 B2 * | 7/2010 | Linck | F23C 3/002 126/91 A |
| 8,573,968 B2 | 11/2013 | Kaupert | |
| 2002/0015930 A1 * | 2/2002 | Poe | F23C 6/047 431/8 |
| 2004/0170936 A1 | 9/2004 | Weclas et al. | |
| 2006/0147854 A1 * | 7/2006 | Fullemann | F23C 6/045 431/9 |
| 2007/0231761 A1 * | 10/2007 | Rosen | F23D 14/22 431/350 |
| 2009/0263757 A1 | 10/2009 | Kaupert | |
| 2010/0092897 A1 * | 4/2010 | Wunning | F23C 3/002 431/6 |
| 2011/0173953 A1 * | 7/2011 | Neels | F01N 3/0253 60/274 |
| 2013/0157206 A1 * | 6/2013 | Li | F23M 5/00 431/159 |
| 2014/0186782 A1 * | 7/2014 | Eberspach | F23C 13/06 431/268 |
| 2014/0346242 A1 | 11/2014 | Jozinovic et al. | |
| 2017/0153026 A1 * | 6/2017 | Dell | F23D 3/40 |

FOREIGN PATENT DOCUMENTS

| | | | | |
|---|---|---|---|---|
| CN | 201129723 Y | 10/2008 | | |
| CN | 201636854 U | 11/2010 | | |
| CN | 201786438 U | 4/2011 | | |
| CN | 102200279 A | 9/2011 | | |
| CN | 202813362 U | 3/2013 | | |
| DE | 19 18 445 A1 | 10/1970 | | |
| DE | 28 12 960 A1 | 10/1978 | | |
| DE | 34 03 972 A1 | 8/1985 | | |
| DE | 3923238 A1 * | 1/1991 | ............. | F23C 9/006 |
| DE | 43 04 057 A1 | 8/1994 | | |
| DE | 195 29 994 A1 | 5/1996 | | |
| DE | 195 48 223 A1 | 6/1997 | | |
| DE | 197 03 555 A1 | 6/1998 | | |
| DE | 198 21 672 A1 | 11/1999 | | |
| DE | 101 20 027 A1 | 4/2002 | | |
| DE | 101 51 617 A1 | 5/2003 | | |
| DE | 102 00 524 C1 | 6/2003 | | |
| DE | 102 19 633 C1 | 12/2003 | | |
| DE | 102004022302 A1 | 12/2005 | | |
| DE | 44 47 987 B4 | 3/2006 | | |
| DE | 10 2004 049902 A1 | 4/2006 | | |
| DE | 10 2006 031867 A1 | 1/2008 | | |
| DE | 10 2011 087971 A1 | 6/2012 | | |
| EP | 1 519 110 A1 | 3/2005 | | |
| EP | 1 860 379 A2 | 11/2007 | | |
| JP | S5364831 A | 6/1978 | | |
| JP | S57174607 A | 10/1982 | | |
| JP | S61188217 A | 8/1986 | | |
| JP | H0524430 A | 2/1993 | | |
| JP | H0749104 A | 2/1995 | | |
| JP | H10246408 A | 9/1998 | | |
| JP | 2000018520 A | 1/2000 | | |
| JP | 2004156898 A | 6/2004 | | |
| JP | 2004163090 A | 6/2004 | | |
| KR | 101278280 B1 | 6/2013 | | |
| RU | 2213298 C1 | 9/2003 | | |
| RU | 48619 U1 | 10/2005 | | |
| WO | 2012149928 A1 | 11/2012 | | |
| WO | 2012155897 A1 | 11/2012 | | |
| WO | 2013104349 A1 | 7/2013 | | |
| WO | 2013127393 A1 | 9/2013 | | |
| WO | 2015 014338 A1 | 2/2015 | | |

OTHER PUBLICATIONS

"DE_4447987_B4—Machine Translation.pdf", machine translation, EPO.org, Jun. 12, 2018.*
"DE_10200524_C1—Machine Translation.pdf", machine translation, EPO.org, Jun. 13, 2018.*
The International Search Report and Written Opinion dated Jun. 22, 2015 for International Application No. PCT/DE2015/100102.
European Patent Office, Machine-Generated English Language Translation of DE 19529994, Jun. 11, 2018, 13 pages.
European Patent Office, Machine-Generated English Language Translation of EP 1860379, Jun. 11, 2018, 10 pages.

* cited by examiner

EVAPORATOR BURNER FOR A MOBILE HEATING UNIT OPERATED USING LIQUID FUEL

CROSS-REFERENCE TO RELATED APPLICATIONS

This application represents the national stage entry of PCT International Application No. PCT/DE2015/100102 filed Mar. 11, 2015, which claims priority of German Patent Application 10 2014 103 817.7 filed Mar. 20, 2014, the contents of which are hereby incorporated herein by reference for all purposes.

The present invention relates to an evaporator burner for a mobile heating device operated with liquid fuel, and to a vehicle heating device having an evaporator burner of said type.

In mobile heating devices operated with liquid fuel, use is commonly made of evaporator burners in which the liquid fuel is evaporated, the evaporated fuel is mixed with supplied combustion air to form a fuel-air mixture, and is subsequently reacted with a release of heat.

In the present context, a "mobile heating device" is to be understood to mean a heating device which is designed and correspondingly adapted for use in mobile applications. This means in particular that said heating device is transportable (possibly fixedly installed in a vehicle or merely accommodated therein for transportation) and is not designed exclusively for permanent static use, such as in the case, for example, of a heating system of a building. Here, the mobile heating device may also be fixedly installed in a vehicle (land vehicle, ship, etc.), in particular in a land vehicle. Said mobile heating device may in particular be designed for the heating of a vehicle interior compartment, for example of a land vehicle, a watercraft or an aircraft, and for the heating of a partially open space such as can be found for example on ships, in particular yachts. The mobile heating device may also be temporarily used in static fashion, for example in large tents, containers (for example building containers), etc. In particular, the mobile heating device may be designed as an engine-independent heater or auxiliary heater for a land vehicle, for example for a caravan, a motorhome, a bus, a passenger motor vehicle, etc.

With regard to environmental aspects and the legislation in this regard in many countries, it is becoming ever more important to minimize the exhaust-gas emissions of mobile heating devices. In particular in the case of evaporator burners for mobile heating devices, there is the difficulty here that it is sought to realize operation under a variety of external boundary conditions and with different heating power levels, in each case in the most efficient manner possible and with low exhaust-gas emissions.

It is an object of the present invention to provide an improved evaporator burner for a mobile heating device operated with liquid fuel, and to provide an improved vehicle heating device having an evaporator burner of said type, which permit operation with very low emissions in particular under a variety of external boundary conditions.

The object is achieved by way of an evaporator burner for a mobile heating device operated with liquid fuel according to claim 1. Advantageous refinements are specified in the dependent claims.

The evaporator burner has the following: a mixture preparation region for the mixing of fuel with combustion air to form a fuel-air mixture; a fuel supply for the supply of liquid fuel to the mixture preparation region; a combustion-air supply for the supply of combustion air to the mixture preparation region; at least one evaporation surface to which the liquid fuel is supplied for the purposes of evaporation of the liquid fuel; a reaction region which is arranged downstream of the mixture preparation region in terms of flow and which serves for the reaction of the fuel-air mixture to form combustion exhaust gases with a release of heat; and an exhaust-gas recirculation arrangement for the recirculation of combustion exhaust gases into the mixture preparation region.

Here, a mixture preparation region is to be understood to mean a region of the evaporator burner in which, during the normal heating operation of the evaporator burner, mixing of evaporated fuel with combustion air takes place but no flame is formed. Advantageous preparation of the fuel-air mixture can take place in the mixture preparation region before the reaction of said fuel-air mixture in the reaction region. In the reaction region, a reaction may take place in particular by way of combustion involving a flame, though a reaction by way of a partially or fully catalytic reaction is for example also possible. By way of the exhaust-gas recirculation arrangement for the recirculation of combustion exhaust gases into the mixture preparation region, emissions of nitrogen oxides ($NO_x$) can be reduced in a particularly reliable manner. Here, the heat of the combustion exhaust gases is utilized both for assisting the evaporation process and for heating the air-fuel mixture. The fuel-absorbing capability of the supplied combustion air is increased by way of an increase of the saturation vapor pressure of the fuel—that is to say the partial pressure of the fuel at which saturation of the gaseous phase with the fuel is reached—which has an advantageous effect in particular in the presence of low outside temperatures and thus a low temperature level of the supplied combustion air. In this way, increased overall efficiency of the evaporator burner is realized. The combustion exhaust gases that are recirculated into the mixture preparation region act as an inert ballast for the processes of the fuel evaporation and of the combustion of the fuel-air mixture. Said inert ballast, by increasing the latent heat, acts so as to accelerate the fuel evaporation process and gives rise to an increase of the ignition delay time, whereby improved mixing of the fuel-air mixture is achieved.

The exhaust-gas recirculation arrangement preferably has at least one exhaust-gas outlet opening which opens into the mixture preparation region and via which the combustion exhaust gases can be recirculated in targeted fashion into the mixture preparation region.

In one refinement, the mixture preparation region has a narrowing region with a cross section which narrows in the direction of the reaction region, and a transition section which adjoins the narrowing region in the direction of the reaction region. By way of the narrowing region, the flow speeds of the fuel-air mixture before it enters the reaction region can be reliably increased to such an extent that an undesired backfiring of the flame into the mixture preparation region is prevented. Here, by way of the transition section, the flow behavior can be predefined in a targeted manner.

The exhaust-gas recirculation arrangement is preferably designed so as to open into the transition section where a reliable induction of combustion exhaust gases is possible owing to the low static pressure prevailing there.

In one refinement, an abrupt cross-sectional widening of the flow chamber is formed at a transition from the transition section to the reaction region. In this case, in particular in the case of the combustion air being supplied to the mixture preparation region with intense swirl, particular stabilization of the flame in the reaction region is made possible, and it is possible for stable combustion with low pollutant emissions to be ensured over a large range of different levels of heating power, that is to say different fuel and combustion air mass flows.

In one refinement, the transition section has a firsts subsection, which adjoins the narrowing region and which has a first cross section, and a second subsection, which adjoins the reaction region and which has a larger second cross section, and the exhaust-gas outlet opening is in the form of a ring-shaped opening between the first sub-section and the second subsection. In this case, a configuration is realized which is particularly advantageous in terms of construction and which permits a reliable induction of the combustion exhaust gases and, at the same time, stable flow guidance of the fuel-air mixture.

In one refinement, an axial body is provided which extends in the mixture preparation region along a longitudinal axis of the evaporator burner so as to be spaced apart from a side wall. Here, the axial body may for example be of solid form or else may have an internal cavity, it is preferably possible for the axial body to have a substantially cylindrical shape. Particularly advantageous flow guidance in the mixture preparation region is made possible by way of the axial body. Furthermore, the axial body may preferably be manufactured from a material with high thermal conductivity, such that heat energy from the combustion process in the reaction region is recirculated in targeted fashion, by heat conduction via the axial body, into the mixture preparation region for the purposes of assisting the evaporation of the liquid fuel and assisting the preparation of the fuel-air mixture.

If the axial body extends from a face side of the mixture preparation region at least into the transition section to the reaction region, it is possible for heat from the reaction region to be recirculated in particularly targeted fashion into the mixture preparation region via the axial body.

In one refinement, the evaporation surface is formed on an outer circumferential surface of the axial body. In this case, the supplied combustion air can be guided in a particularly effective manner along the evaporation surface such that good mixing of the evaporated fuel with the supplied combustion air is realized. Furthermore, in this case, heat from the combustion process in the reaction region can be supplied in particularly targeted fashion via the axial body to the evaporation process in the mixture preparation region.

In one refinement, the evaporation surface is provided by an evaporation element, and a cover is provided on an end, facing toward the reaction region, of the evaporator element. In this case, an uncontrolled escape of fuel at the face-side end of the evaporator element can be prevented in a reliable manner. The cover may preferably project in a radial direction beyond an outer circumference of the evaporator element.

In one refinement, the axial body has an internal cavity which is open toward the reaction region and from which an exhaust-gas outlet opening extends to the mixture preparation region such that combustion exhaust gases can be recirculated through the axial body to the mixture preparation region. In this case, a configuration which is particularly simple in terms of construction is provided in which the axial body is also utilized for the recirculation of the combustion exhaust gases into the mixture preparation region. The evaporator burner can in this case be realized in a particularly compact design. It is preferably possible in this case for the exhaust-gas outlet opening to be arranged in the first half of the mixture preparation region (in relation to the main flow direction), in particular more preferably in the first third of the mixture preparation region, even more preferably in the first quarter or even in the first fifth of the mixture preparation region.

The object is also achieved by way of a vehicle heating device having an evaporator burner as described above.

Further advantages and refinements will emerge from the following description of exemplary embodiments with reference to the appended drawings.

Figure 8:
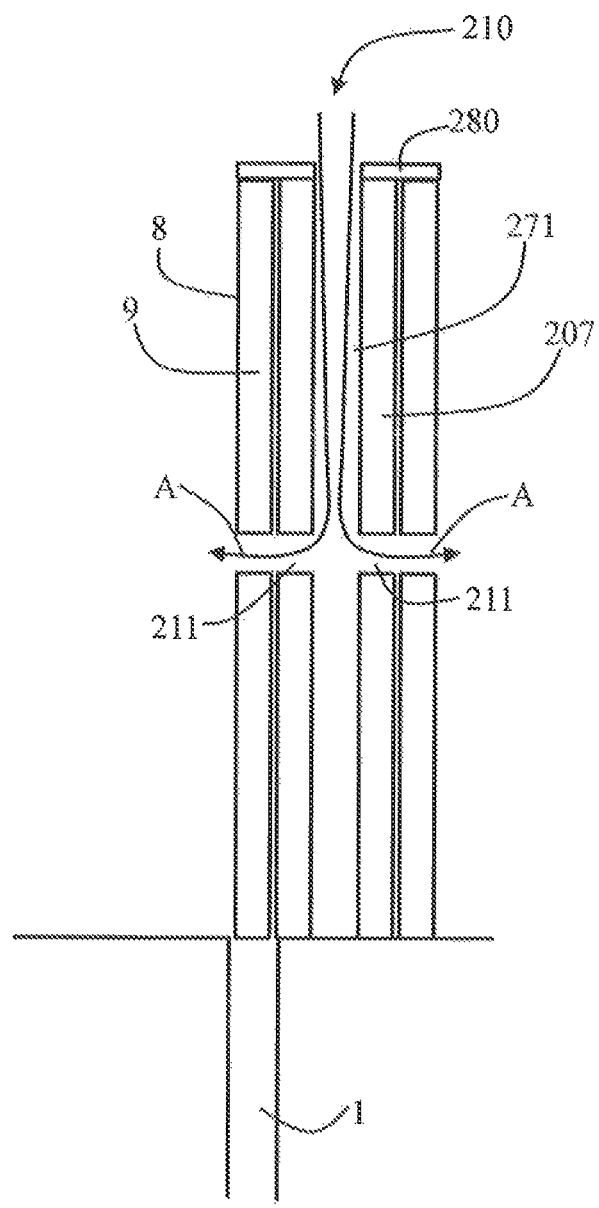
FIG. 8 is a schematic illustration of a further modification of the axial body illustrated in FIG. 3.
Figure 9:
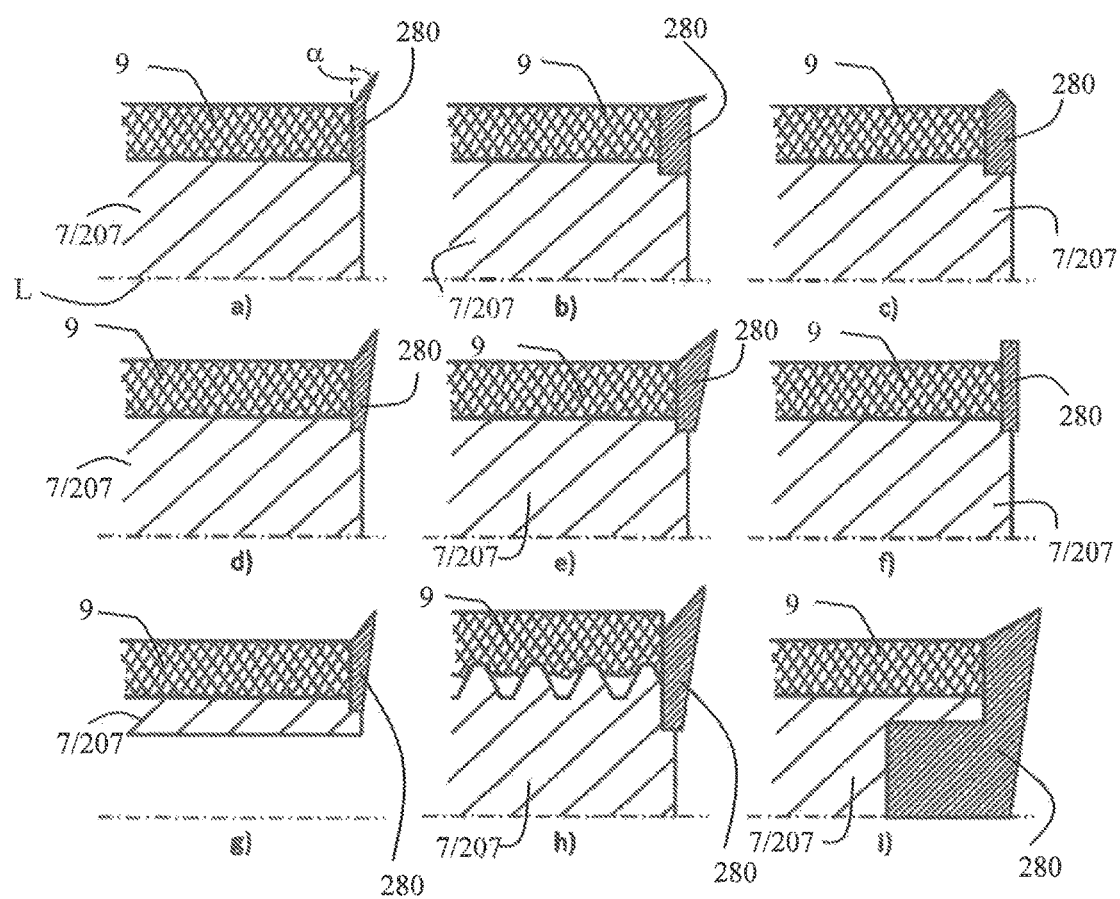

FIGS. 9 *a*) to *i*) are schematic illustrations of refinements of the further modification illustrated in FIG. 8.

FIRST EMBODIMENT

A first embodiment of the evaporator burner will be described below with reference to FIG. 1.

The evaporator burner 100 according to the first embodiment is designed for a mobile heating device operated with liquid fuel. Here, the evaporator burner 100 is designed specifically for a vehicle heating unit, in particular for an engine-independent heater or auxiliary heater of a motor vehicle.

The evaporator burner 100 extends along a longitudinal axis L. The evaporator burner 100 has a mixture preparation region 2 which has a main chamber 21, a narrowing region 22 adjoining the main chamber 21, and a transition section 23 adjoining the narrowing region 22. In the narrowing region 22, the cross section of the mixture preparation region 2 narrows in a main flow direction H which runs substantially parallel to the longitudinal axis L. In the schematically illustrated exemplary embodiment, a conical form of the narrowing region 22 is illustrated by way of example, though other configurations are also possible. The transition section 23 forms a transition to the reaction region 3 which adjoins the mixture preparation region 2. In the embodiment, the transition section 23 has a substantially cylindrical shape with a constant cross section.

An abrupt cross-sectional widening is formed at the transition from the transition section 23 of the mixture preparation region 2 to the reaction region 3. The flow cross section available for the gases which flow into the evaporator burner 100 thus widens abruptly at the transition from the mixture preparation region 2 to the reaction region 3.

In the specific exemplary embodiment, in the operation of the evaporator burner 100, a reaction of a fuel-air mixture in a combustion process involving a flame takes place, with a release of heat, in the reaction region 3. The combustion exhaust gases A generated during said reaction flow through a combustion pipe 4, which adjoins the reaction region 3, into a heat exchanger 5 in which at least a part of the released heat is transferred to a medium M to be heated. In the schematically illustrated embodiment, the heat exchanger 5 is of pot-like form, and the hot combustion exhaust gases A are diverted at the end of the combustion pipe 4 on the base of the heat exchanger 5. After the diversion, the combustion exhaust gases A flow in a flow chamber formed between an outer side of the combustion pipe 4 and an inner shell of the heat exchanger 5 to an exhaust-gas outlet 6.

Figure 1:
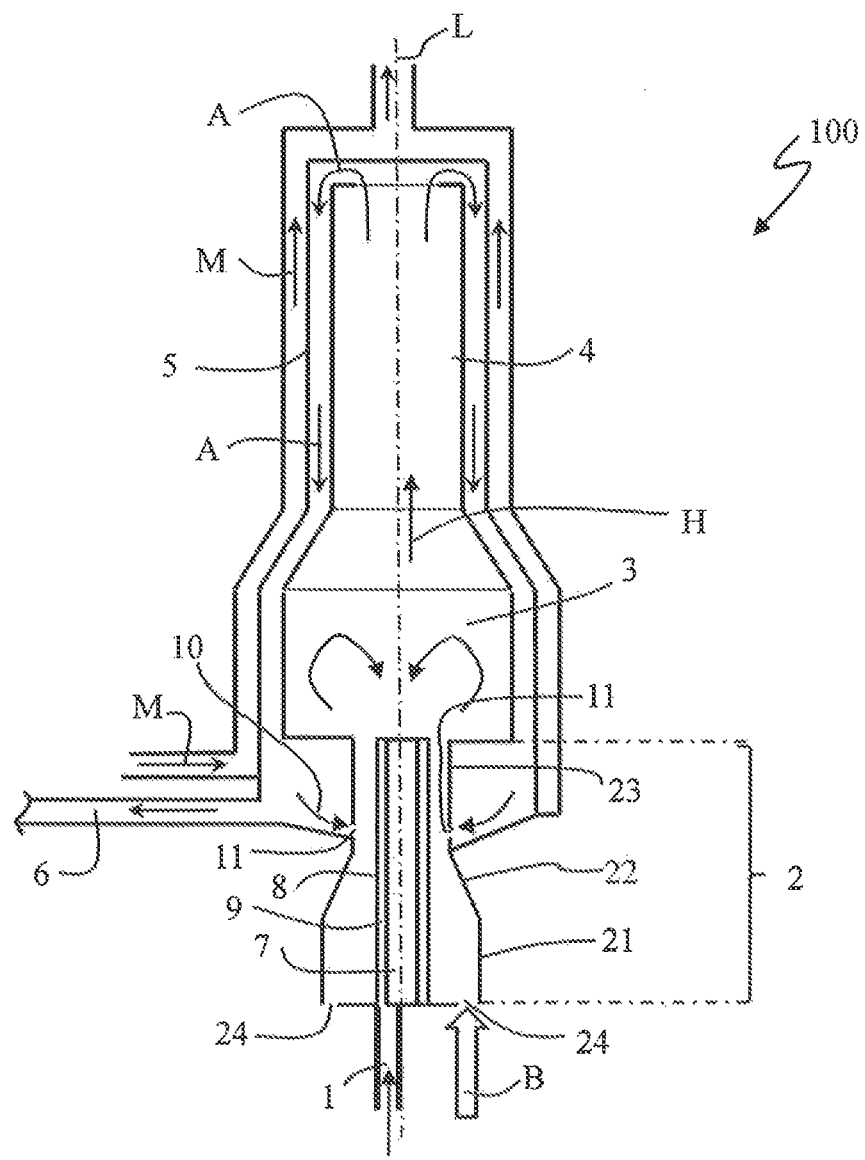
FIG. 1 is a schematic illustration of an evaporator burner according to a first embodiment.

The medium M to be heated flows in a flow chamber which is formed between the inner shell of the heat exchanger 5 and an outer shell of the heat exchanger 5, as is schematically illustrated in FIG. 1 by arrows. Here, in the embodiment, the medium M to be heated flows oppositely to the flow direction of the combustion exhaust gases A in the heat exchanger 5 in order to realize the best possible beat transfer. The medium M to be heated may in this case be formed in particular by for example air to be heated or liquid to be heated, in particular the cooling liquid in a cooling-liquid circuit of a vehicle. The inner shell of the heat exchanger 5 is manufactured from a material with high thermal conductivity in order to ensure good heat transfer from the hot combustion exhaust gases A to the medium M to be heated.

Below, the design of the mixture preparation region 2 in the first exemplary embodiment will be described in more detail.

The evaporator burner 100 has a fuel supply 1 for the supply of a liquid fuel. The liquid fuel may in this case be formed in particular by a fuel which is also used for the operation of an internal combustion engine of the vehicle, in particular by gasoline, diesel, ethanol or the like. The fuel supply 1 is, in FIG. 1, illustrated merely schematically by a fuel supply line and an arrow. The fuel supply 1 may however—in a manner known per se—also have a fuel delivery device which may be formed in particular by, for example, a fuel dosing pump. The fuel supply 1 is designed for delivering and dosing fuel in a well-defined manner.

The fuel supply 1 opens into the mixture preparation reaction 2. In the schematically illustrated embodiment, the fuel supply 1 opens out in this case at a face side of the mixture preparation region 2, which face side closes off the mixture preparation region 2 at the rear side. The mixture preparation region 2 is delimited laterally by a side wall which defines the profile of the main chamber 21, of the narrowing region 22 and of the transition section 23.

Also provided is a combustion air supply B which, in FIG. 1, is illustrated merely schematically by an arrow. The combustion air supply B has a combustion-air blower (not illustrated) for the delivery of combustion air to the mixture preparation region 2. The mixture preparation region 2 has a multiplicity of combustion air inlets 24 through which the combustion air can enter the mixture preparation region 2. In the exemplary embodiment, the combustion air is introduced into the mixture preparation region 2 with intense swirl, that is to say with a large tangential flow component. Here, the swirl of the combustion air may be imparted for example by way of correspondingly oriented guide vanes or the like. Even though FIG. 1 schematically illustrates an arrangement in which the combustion air inlets 24 are arranged radially at the outside on the face side of the mixture preparation region 2, other arrangements are also possible. For example, the combustion air inlets may also be arranged laterally on the side wall of the mixture preparation region 2.

In the first embodiment, there is arranged in the mixture preparation region 2 an axial body 7 which extends along the longitudinal axis L proceeding from the face side of the mixture preparation region 2 and so as to be spaced apart from the side wall of the mixture preparation region 2. In the first embodiment, the axial body 7 is of rod-shaped or tower-like form. The axial body 7 has a substantially cylindrical form and, in the first embodiment, extends through the main chamber 21, the narrowing region 22 and the transition section 23. The axial body 7 is arranged substantially centrally, with respect to its radial orientation, in the mixture preparation region 2. The axial body 7 has an outer circumferential surface on which an evaporation surface 8 for the evaporation of supplied liquid fuel is formed. In the first embodiment, the evaporation surface 8 is provided by a porous, absorbent evaporator element 9 which is arranged on the outer circumferential surface of the axial body 7. The evaporator element 9 may in this case have in particular a metal nonwoven, a metal fabric, a metallic or ceramic sintered body or the like. It is preferably possible here for the evaporator element 9 to extend around the axial body 7 over the entire outer circumference thereof.

Even though FIG. 1 schematically illustrates an embodiment in which the evaporator element 9 extends substantially over the entire axial length of the axial body 7, it is for example also possible for the evaporator element 9 to extend only over a subregion of the axial body 7. Even though only an embodiment in which the evaporation surface 8 is provided by an evaporator element 9 of said type has been described with reference to FIG. 1, configurations are also possible in which the outer circumferential surface of the axial body 7 is itself formed as an evaporation surface 8.

The supplied liquid fuel is, at the face side of the mixture preparation region 2, transferred to the evaporator element 9, in which a distribution of the liquid fuel takes place. Owing to the porous, absorbent configuration of the evaporator element 9, the liquid fuel is distributed here both in the circumferential direction of the axial body 7 and in the axial direction of the axial body 7. Proceeding from the evaporation surface 8, the supplied liquid fuel evaporates and is mixed, in the mixture preparation region 2, with the supplied combustion air which is conducted along the evaporation surface 8. Owing to the fact that the combustion air is supplied with intense swirl, good mixing of the evaporated fuel with combustion air to form a fuel-air mixture occurs already here.

In the narrowing region 22 of the mixture preparation region 2, owing to the reduction in cross section, the axial flow speed component of the fuel-air mixture increases, and in accordance with Bernoulli's principle, a resulting reduction of the static pressure in the transition section 23 occurs. At the transition from the mixture preparation region 2 to the reaction region 3, a widening of the swirling flow of the fuel-air mixture occurs owing to the abrupt cross-sectional widening, whereby the axial flow speed component decreases and, in the center of the reaction region 3 close to the longitudinal axis L, an axial backflow region forms in which gases flow counter to the main flow direction H, such that, during the operation of the evaporator burner 100, good anchoring of the flame in the reaction region 3 is realized.

The dimensions of the narrowing region 22, of the transition region 23 and of the transition to the reaction region 3 are coordinated with the swirling flow of the fuel-air mixture such that backfiring of the flame from the reaction region 3 into the mixture preparation region 2 is reliably prevented. In particular, the combustion air is supplied to the mixture preparation region 2 with swirl intense enough, and a flow speed high enough, that said condition is satisfied.

The axial body 7 exhibits high thermal conductivity such that, during the operation of the evaporator burner 100, heat is conducted from the combustion process taking place in the reaction region 3 hack to the mixture treatment region 2, in order to realize an advantageous evaporation process of the liquid fuel on the evaporation surface 8.

In the case of the evaporator burner 100 according to the first embodiment, there is also formed an exhaust-gas recirculation arrangement 10 for the recirculation of combustion exhaust gases A into the mixture preparation region 2. In the exemplary embodiment schematically illustrated in FIG. 1, the exhaust-gas recirculation arrangement 10 has a multiplicity of exhaust-gas outlet openings 11 which open into the mixture preparation region 2 and through which outflowing combustion exhaust gases A can enter the mixture preparation region 2, in the embodiment illustrated, the exhaust-gas outlet openings 11 are in this case connected in terms of flow to the flow chamber formed in the heat exchanger 5, in which flow chamber the combustion exhaust gases A flow out.

The exhaust-gas outlet openings 11 of the exhaust-gas recirculation arrangement 10 open out in the transition section 23 of the mixture preparation region 2. Owing to the low static pressure in the transition section 23, a part of the combustion exhaust gases A is in this case reliably drawn into the mixture preparation region and mixed there with the fuel-air mixture. The intense swirl of the fuel-air mixture flowing in the transition section 23 leads in this case to homogeneous mixing with the combustion exhaust gases A. Said mixing of combustion exhaust gases A with the fuel-air mixture permits operation of the evaporator burner 100 with particularly low pollutant emissions, in the case of which it is in particular also possible for emissions of nitrogen oxides to be kept low.

SECOND EMBODIMENT

A second embodiment of an evaporator burner 200 will be described in more detail below with reference to FIG. 2 and FIG. 3.

The evaporator burner 200 according to the second embodiment differs from the first embodiment described above substantially only with regard to the configuration of the axial body and of the exhaust-gas recirculation arrangement; such that, below, in order to avoid repetitions, only the differences in relation to the first embodiment will be described, and the same reference designations will be used for the corresponding components.

In the case of the evaporator burner 200 according to the second embodiment, a modified axial body 207 is provided instead of the rod-shaped solid axial body 7, The axial body 207 according to the second embodiment has, at least on its side facing toward the reaction region 3, an internal cavity 271 which is formed so as to be open toward the reaction region 3. In particular, the internal cavity 271 extends in the axial direction from that face side of the axial body 207 which faces toward the reaction region 3 at least into the region of the transition section 23.

In the case of the evaporator burner 200, the exhaust-gas recirculation arrangement 210 for the recirculation of combustion exhaust gases into the mixture preparation region 2 is designed such that combustion exhaust gases A are recirculated from the reaction region 3 via the internal cavity 271 in the axial body 207 into the mixture preparation region 2. The exhaust-gas recirculation arrangement 210 has a multiplicity of exhaust-gas outlet openings 211 which open out in the transition section 23 of the mixture preparation region 2 and which are formed as apertures in the wall of the axial body 207. Even though a multiplicity of exhaust-gas outlet openings has been described with reference to the embodiment, it is for example also possible for only one exhaust-gas outlet opening to be provided. The exhaust-gas outlet openings 211 are designed so as to form a connection of the internal cavity 271 to the transition section 23 of the mixture preparation region 2.

Figure 2:
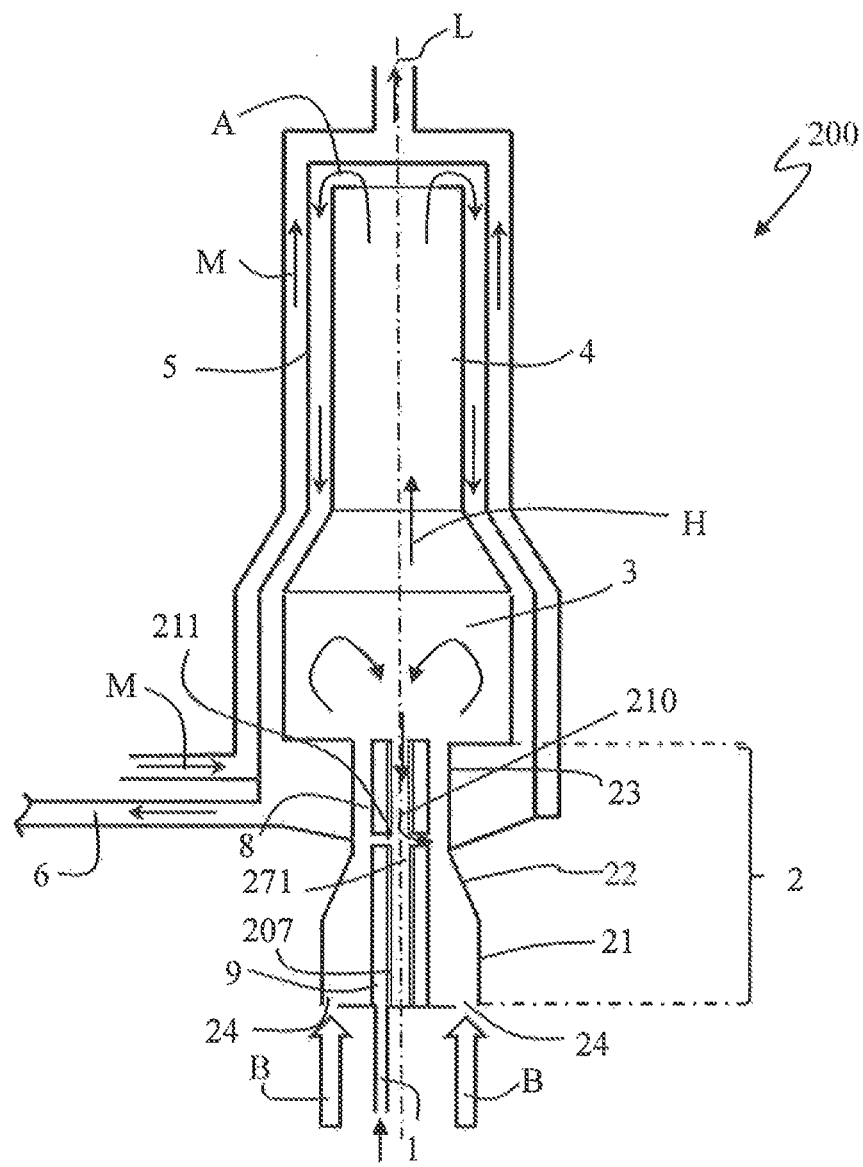
FIG. 2 is a schematic illustration of an evaporator burner according to a second embodiment.
Figure 3:
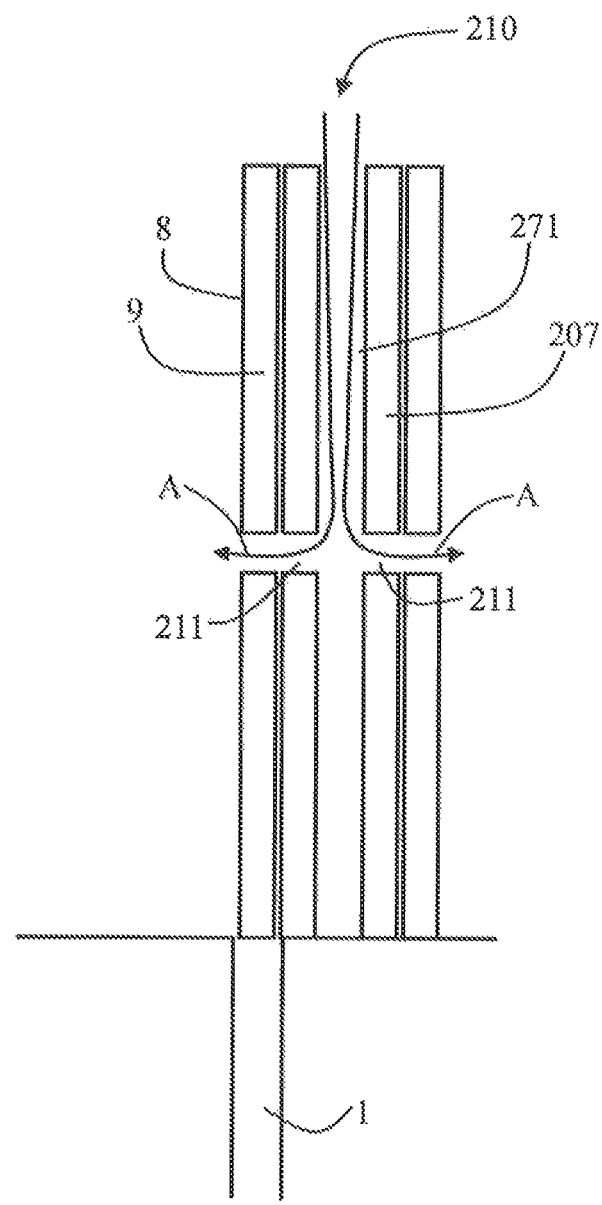
FIG. 3 is a schematic enlarged illustration of an axial body in the case of the second embodiment.

In the case of the embodiment schematically illustrated in FIG. 2 and FIG. 3, the evaporator element 9 is likewise interrupted in the region of the exhaust-gas outlet openings, such that the combustion exhaust gases A can flow out freely into the transition section 23.

It has already been described with reference to the first embodiment that, owing to the geometrical design of the mixture preparation region 2 and of the transition to the reaction region 3 in combination with the intense swirling flow of the fuel-air mixture at the inlet into the reaction region 3, an axial recirculation region forms in the reaction region 3 close to the longitudinal axis L, in which recirculation region the gases in the reaction region 3 flow counter to the main flow direction H. Since the internal cavity 271 of the axial body 207 is open toward the reaction region 3 in the region close to the axis, it is possible for combustion exhaust gases A from the recirculation region to enter the internal cavity 271 and flow via the internal cavity 271 and the exhaust-gas outlet openings 211 into the transition section 23 of the mixture preparation region 2. Owing to the low static pressure in the region of the transition section 23, the combustion exhaust gases A are in this case inducted and mixed with the fuel-air mixture flowing in the transition section 23. Here, it is firstly the case that transportation of heat into the mixture preparation region 2 occurs owing to the convective heat transfer from the backflowing combustion exhaust gases A to the axial body 207, whereby the fuel evaporation is improved, and it is secondly the case that an admixing of exhaust gas to the fuel-air mixture, and consequently a lowering of the combustion temperature, takes place, because additional inert ballast participates in the combustion.

Even though the schematic illustration in FIG. 2 and FIG. 3 shows in each case an internal cavity 271 which extends in the interior of the axial body 207 as far as the face side of the mixture preparation region 2, other configurations are also possible, in which the internal cavity 271 does not extend so far rearward in the axial direction.

In a modification, schematically illustrated in FIG. 8, of the axial body 207 described with reference to FIG. 3, the axial body 207 is further developed such that liquid fuel and also excess fuel vapor cannot emerge in the axial direction at the face side of the axial body 207 but is forced to emerge from the evaporator element 9 in the radial direction. As schematically illustrated in FIG. 8, there is provided on the free face side of the axial body 207 a cover 280 which projects in the radial direction from the outer circumference of the rest of the axial body 207 and which covers the free face side of the evaporator element 9. The cover 280 is formed from at least one substantially impermeable material such that liquid fuel and fuel vapor cannot pass through the cover 280, preferably from metal, in particular from temperature-resistant high-grade steel. The cover 280 may for example be in the form of a separate covering disk which is fastened detachably or non-detachably to the face-side end of the axial body 207. In another configuration, it is for example also possible for the cover 280 to be produced in one piece with the axial body 207 from the same material.

The cover 280 serves to prevent fuel or fuel vapor from emerging in particular to an increased extent at the free end of the axial body 207 from the evaporator element 9. In this way, it is achieved that the fuel is supplied at least substantially entirely for forming the fuel-air mixture in the mixture preparation region 2, such that the mixture preparation in the mixture preparation region 2 is further improved. Furthermore, in this way, adverse influencing of the flame anchoring in the reaction region 3 is prevented. Furthermore, this prevents a situation in which unburned fuel or fuel vapor is inducted into the internal cavity 271, such that power losses owing to this and a possible shortening of service life are avoided.

FIGS. 9 *a*) to *i*) schematically illustrate various refinements of the cover 280. Said refinements of the cover may in each case be provided both in the case of a substantially solid axial body 7, such as has been described with reference to FIG. 1, and in the case of an axial body 207 with an internal cavity, such as has been described with reference to the second embodiment and the modification thereof.

In the refinements of the cover 280 illustrated in FIGS. 9 *a*) to *i*), the cover 280 projects in the radial direction in each case beyond the outer circumference of the evaporator element 9 and provides an at least substantially sharp separation edge for the flow passing along the outer circumference of the axial body 7 or 207 and of the evaporator element 9. As is schematically illustrated in FIG. 9 *a*), that region of the cover 280 which projects in the radial direction extends at an angle α relative to a plane which runs perpendicular to the longitudinal axis L. Here, depending on the desired flow guidance, the angle α may have a value between 0° and 90°.

In the modification schematically illustrated in FIG. 9 *a*), that region of the cover 280 which projects in the radial direction extends for example at an angle α in the range between 35° and 45°, such that the gases flowing along the outer circumference of the evaporator element 9 are diverted radially outward there in a relatively intense manner. Furthermore, in the case of this modification, the projecting region is in the form of a lip which tapers in the radial direction and which projects both in the radial direction and in the axial direction. The projecting region is in this case angled slightly in the direction of the main flow direction H in relation to the rest of the cover 280.

In the modification schematically illustrated in FIG. 9 *b*), that region of the cover 280 which projects in the radial direction extends at a considerably greater angle α, which amounts to between 160° and 170°, such that the gases flowing along the outer circumference of the evaporator element 9 are subjected to a considerably less pronounced radial deflection.

In the case of the modification schematically illustrated in FIG. 9 *c*), that region of the cover which projects in the radial direction extends for example at an angle of between approximately 40° and 50°. Furthermore, in the case of this modification, the projecting region of the cover 280 is also beveled or chamfered on the side averted from the evaporator element 9 in order to influence the flow separation in a targeted manner.

In the case of the modifications schematically illustrated in FIGS. 9 *d*) and 9 *e*), the cover 280 has in each case an altogether more wedge-shaped cross section such that the projecting region of the cover 280 is—by contrast to the modifications of FIG. 9 *a*) And FIG. 9 *b*)—not of angled form in relation to the rest of the cover 280. As is evident from a comparison of the modifications as per FIGS. 9 *a*) and *b*) and the modifications as per FIGS. 9 *d*), 9 *e*) and 9 *i*), the wedge angle of the radially projecting region of the cover 280 can be set in targeted fashion in this way.

In the modification schematically illustrated in FIG. 9 *f*), the cover 280 is in the form of a substantially ring-shaped disk on the end of the axial body 7/207, such that the projecting region of the cover projects laterally at an angle α of approximately 0°.

Even though it is only the case in the modification schematically illustrated in FIG. 9 *g*) that the axial body 7/207 is provided with an internal cavity which is formed so as to be open in the direction of the reaction region 3, this may preferably also be provided in the other modifications. In this case, it is possible for gases from the reaction region 3 to flow into the interior of the axial body 7/207 and be recirculated via the latter into the mixture preparation region 2.

FIG. 9 *h*) illustrates, by way of example, a surface structuring of the outer circumference of the axial body 7/207. Such a surface structuring may preferably likewise also be provided in the other illustrations as per FIGS. 9 *a*) to *g*) and *i*). In the case of the modification of FIG. 9 *h*), the cover 280 furthermore bears, in a region situated radially at the inside, directly at a face side against the evaporator element 9, and runs at an angle α of approximately 0°. By contrast, a region of the cover 280 situated further to the outside runs at a relatively large angle α, such that, in turn, a radially projecting, tapering lip is formed. Furthermore, in a region of the evaporator element 9 situated radially at the outside, the cover 280 in this case does not bear directly against the evaporator element 9. These supplementary features of the modification of FIG. 9 *h*) may furthermore also be realized in the other modifications.

In the modification schematically illustrated in FIG. 9 *i*), the cover 280 is in the form of an insert which is inserted with a central protruding peg into a face-side recess of the axial body 7/207. An aperture for the recirculation of exhaust gases into the interior of the axial body may be preferably provided in said peg also. These further features may in each case also be realized in the other modifications.

The configuration of the cover 280 with the separation edge described here has the further advantage that the flow at the inlet into the reaction region 3 is stabilized even more effectively. Inter alia, it is possible in this way for the generation of pulsations to be prevented. Furthermore, backfiring of the flame into the mixture preparation region 2 can be even more reliably prevented. Altogether, it is in particular furthermore also possible, by way of the modifications of the cover 280 with the described separation edge for the flow of the fuel-air mixture, for the formation of the recirculation region in the reaction region 3 to be additionally yet further stabilized.

Modifications

Figure 6:
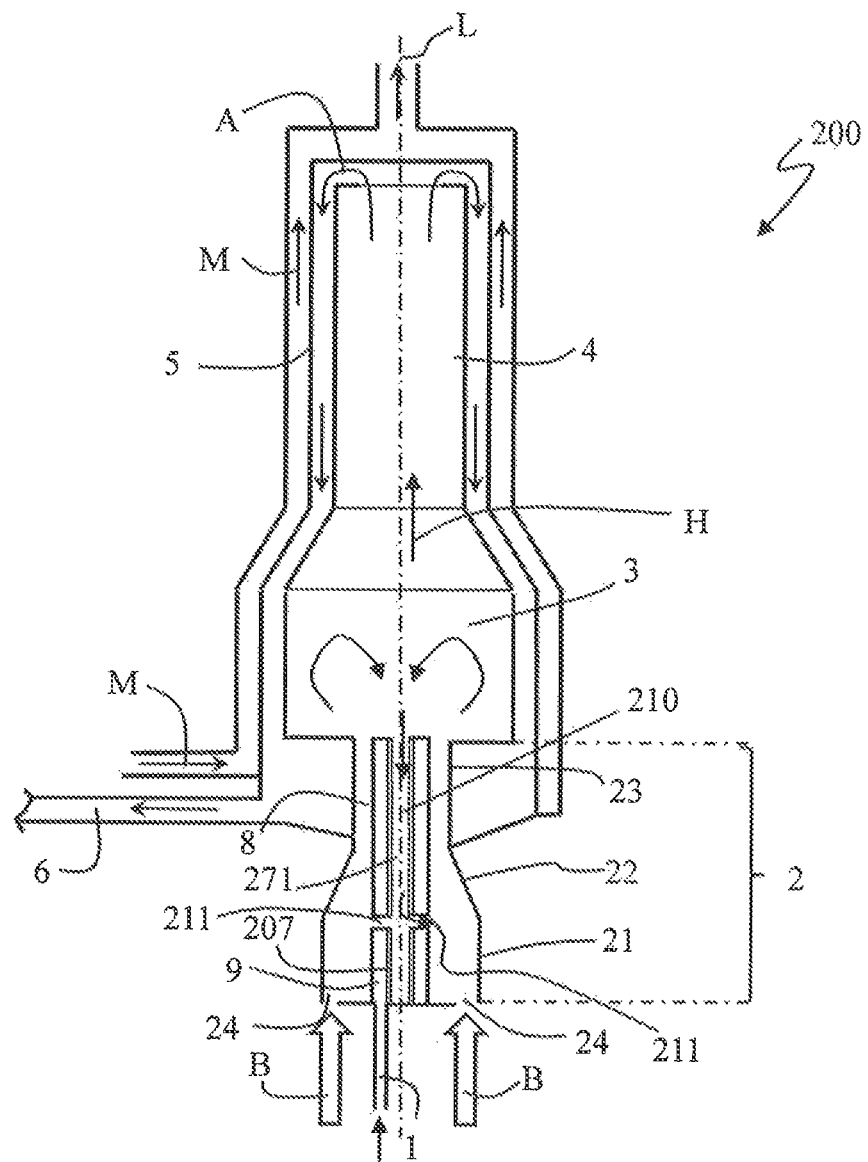
FIG. 6 is a schematic illustration of a first modification of the second embodiment.
Figure 7:
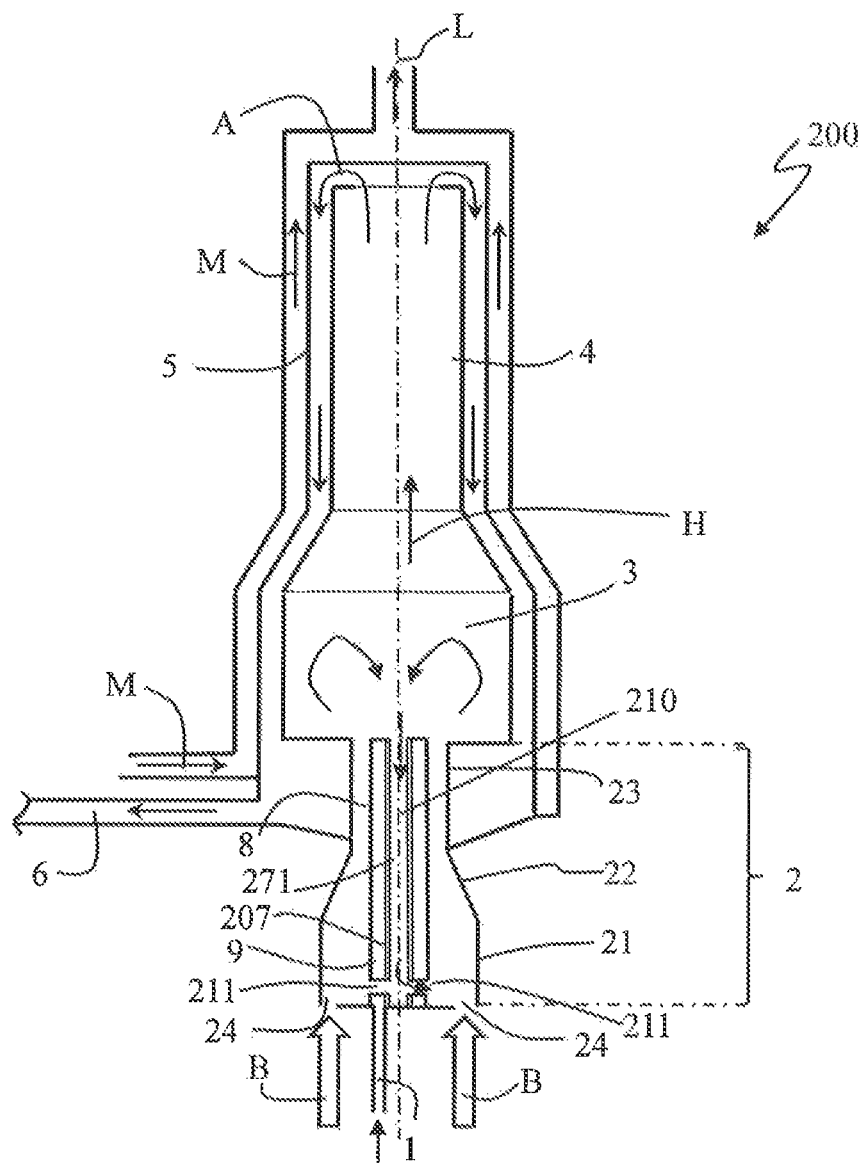
FIG. 7 is a schematic illustration of a second modification of the second embodiment.

FIG. 6 and FIG. 7 show modifications of the above-described second embodiment, which modifications differ from the above-described second embodiment merely with regard to the position of the exhaust-gas outlet openings 211. Although not illustrated in FIGS. 6 and 7, an additional cover 280 as described above may also be provided in the modifications.

In the first modification of the second embodiment as schematically illustrated in FIG. 6, the exhaust-gas outlet openings 211 open out not in the transition section 23 of the mixture preparation region 2 but much further upstream in relation to the main flow direction H, in particular in the first third of the mixture preparation region 2. In the modification illustrated in FIG. 6, the exhaust-gas outlet openings 211 open out for example in the region of the transition from the main chamber 21 of the mixture preparation region 2 to the narrowing region 22. It is however also possible for the exhaust-gas outlet openings 211 to open into the mixture preparation region 2 in the narrowing region 22 and/or in the region of the main chamber 21.

In the second modification of the second embodiment as schematically illustrated in FIG. 7, the exhaust-gas outlet openings 211 open out even further upstream in relation to the main flow direction, in the vicinity of the upstream face side of the mixture preparation region 2, in particular in the first fifth of the mixture preparation region 2.

The relocation of the exhaust-gas outlet openings 211 to a position closer to the upstream face side of the mixture preparation region 2 has the advantage that the recirculated combustion exhaust gases participate even more reliably in the entire preparation process of the fuel-air mixture in the mixture preparation region 2.

THIRD EMBODIMENT

A third embodiment of an evaporator burner 300 will be described in more detail below with reference to FIG. 4 and FIG. 5.

Since the third embodiment differs from the first embodiment substantially only with regard to the configuration of the mixture preparation region 2, substantially only the differences in relation to the first embodiment will be described in more detail below, and the same reference designations as in the first embodiment will be used for corresponding components.

In the case of the evaporator burner 300 according to the third embodiment, no axial body which provides the evaporation surface is provided in the mixture preparation region 2, it rather being the case that, in a region of the face side of the mixture preparation region 2, there is formed a substantially pot-like evaporator receptacle in which there is arranged a substantially areal evaporator element 309. The evaporator element 309 may in this case be manufactured in particular from the same materials as those that have been described with regard to the evaporator element 9 in the case of the first embodiment. In the case of the third embodiment, too, the fuel supply 1 opens out at a face side of the mixture preparation region 2, such that the liquid fuel can be transferred to the evaporator element 309. In the third embodiment, therefore, the evaporation surface 8 is formed in the rear region of the mixture preparation region 2.

By contrast to the first embodiment, in which the combustion air inlets 24 are arranged radially at the outside on the face side of the mixture preparation region 2, it is the case in the third embodiment that the combustion air inlets 24 are arranged in the side wall of the mixture preparation region 2, such that the combustion air enters the mixture preparation region 2 from the outside in a radial direction. Here it is in particular also the case in the third embodiment that the combustion air may preferably have intense swirl imparted to it, which may in turn be realized by way of corresponding air-guiding elements in the combustion air supply B.

Figures 4, 5:
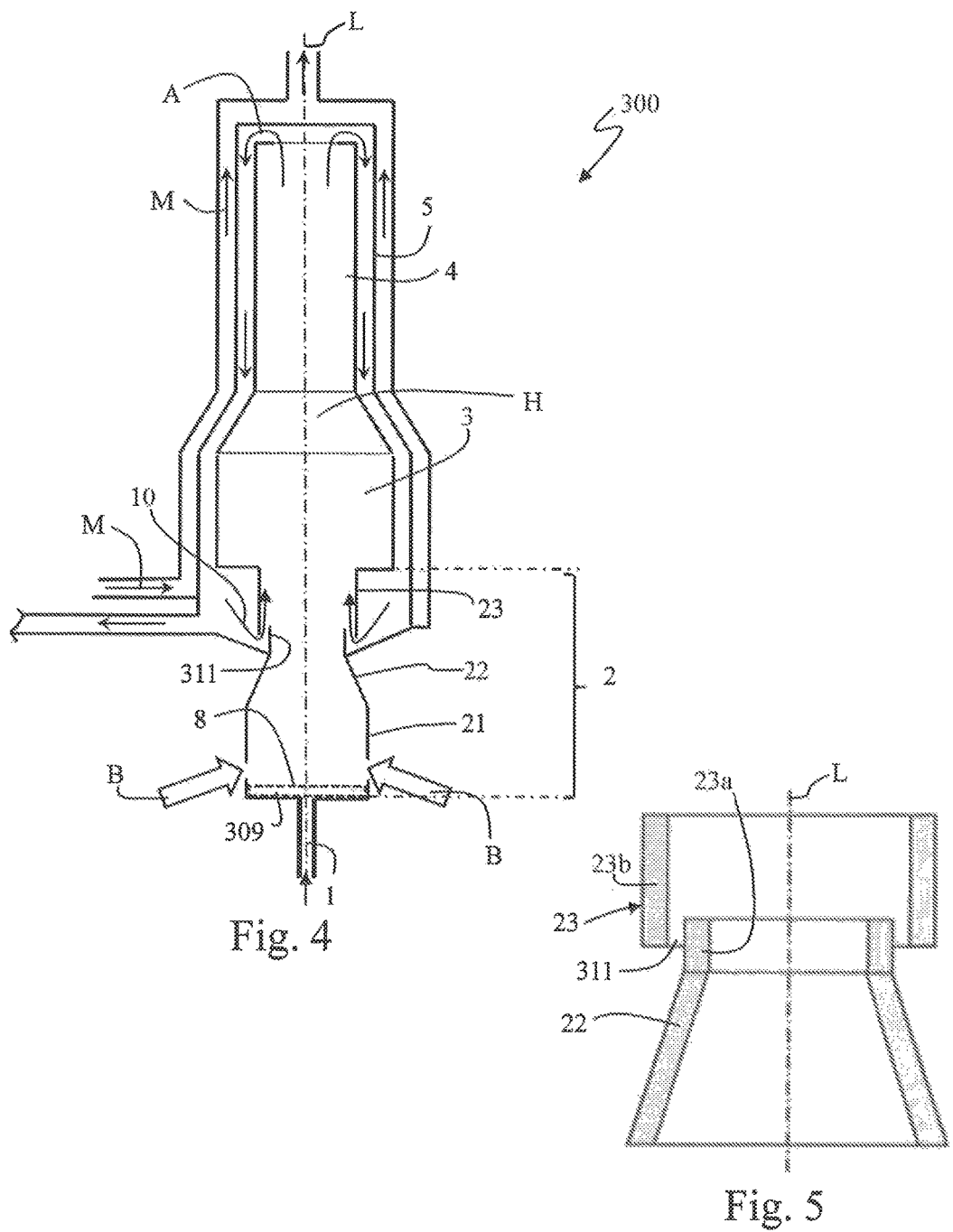
FIG. 4 is a schematic illustration of an evaporator burner according to a third embodiment.
FIG. 5 is a schematic detail illustration of a transition section in the third embodiment.

In the case of the evaporator burner 300 according to the third embodiment, it is furthermore the case that the exhaust-gas recirculation arrangement 10 is of slightly modified design in relation to the first embodiment, as can be seen in particular from FIG. 5. The narrowing region 22 and the transition section 23 are, in the case of the third embodiment, formed in the manner of a stepped nozzle, as illustrated on an enlarged scale in FIG. 5. Even though FIG. 5 schematically shows a configuration which s rotationally symmetrical with respect to the longitudinal axis L, configurations deviating from this are also possible. The transition section 23 has a first subsection 23a and a second subsection 23b. The first subsection 23a is, in the specific configuration illustrated, formed so as to directly adjoin the narrowing region 22 and has a first cross section. The second subsection 23b of the transition section 23 is formed with a relatively large second cross section and engages around the first subsection 23a in the circumferential direction over a part of the axial extent. The first subsection 23a and the second subsection 23b are in this case dimensioned such that a ring-shaped opening is formed between the first subsection 23a and the second subsection 23b, which opening serves, in the third embodiment, as an exhaust-gas outlet opening 311.

In the third embodiment, the exhaust-gas recirculation arrangement 10 is thus formed by way of the ring-shaped opening, which serves as exhaust-gas outlet opening 311, between the first subsection 23a and the second subsection 23b of the transition section 23.

Even though, in the case of the third embodiment, an evaporator burner 300 has been described in which no axial body is arranged in the mixture preparation region 2, it is also possible, in a modification of the third embodiment, for an axial body of said type to likewise be arranged in the mixture preparation region 2, as in the first embodiment or the second embodiment.

Furthermore, the variants specified in the various embodiments may in each case also be used in the other embodiments. In particular, it is for example also possible in the case of an implementation as per the first embodiment for an exhaust-gas recirculation arrangement to be realized by way of a stepped nozzle, as has been described with regard to the third embodiment.

The invention claimed is:

1. An evaporator burner for a mobile heating device operated with liquid fuel, said burner comprising:
    a mixture preparation region mixing fuel with combustion air to form a fuel-air mixture;
    a fuel supply supplying liquid fuel to the mixture preparation region;
    a combustion-air supply supplying combustion air to the mixture preparation region;
    at least one evaporation surface to which the liquid fuel is supplied for evaporation of the liquid fuel;
    a reaction region downstream of the mixture preparation region in terms of flow and which serves for the reaction of the fuel-air mixture to form combustion exhaust gases with a release of heat; and
    an exhaust-gas recirculation arrangement recirculating combustion exhaust gases into the mixture preparation region;
    wherein an axial body extends in the mixture preparation region along a longitudinal axis of the evaporator burner so as to be spaced apart from a side wall of said mixture preparation region, and
    wherein the axial body has an internal cavity which is open toward the reaction region and from which at least one exhaust-gas outlet opening extends to the mixture preparation region such that combustion exhaust gases are recirculated through the axial body to the mixture preparation region.

2. The evaporator burner as claimed in claim 1, wherein the exhaust-gas recirculation arrangement has at least one exhaust-gas outlet opening which opens into the mixture preparation region.

3. The evaporator burner as claimed in claim 1, wherein the mixture preparation region has a narrowing region with a cross section which narrows in the direction of the reaction region, and a transition section which adjoins the narrowing region in the direction of the reaction region.

4. The evaporator burner as claimed in claim 3, wherein the exhaust-gas recirculation arrangement opens into the transition section.

5. The evaporator burner as claimed in claim 3, wherein an abrupt cross-sectional widening of the flow chamber is formed at a transition from the transition section to the reaction region.

6. The evaporator burner as claimed in claim 1, wherein the axial body includes said at least one evaporation surface.

7. The evaporator burner as claimed in claim 6, wherein the axial body extends from a face side of the mixture preparation region at least into a transition section to the reaction region.

8. The evaporator burner as claimed in claim 6, wherein the evaporation surface is formed on an outer circumferential surface of the axial body.

9. The evaporator burner as claimed in claim 8, wherein the evaporation surface is provided by an evaporator element and a cover is provided on an end, facing toward the reaction region, of the evaporator element.

10. The evaporator burner as claimed in claim 9, wherein the cover projects in a radial direction beyond the outer circumference of the evaporator element.

11. A vehicle heating device having an evaporator burner as claimed in claim 1.

* * * * *

UNITED STATES PATENT AND TRADEMARK OFFICE
CERTIFICATE OF CORRECTION

PATENT NO. : 10,234,136 B2
APPLICATION NO. : 15/127330
DATED : March 19, 2019
INVENTOR(S) : Vitali Dell et al.

It is certified that error appears in the above-identified patent and that said Letters Patent is hereby corrected as shown below:

In the Specification

Column 3, Line 6, "firsts" should be --first--.

Column 5, Line 14, "beat" should be --heat--.

Column 5, Line 38, "reaction" should be --region--.

Column 6, Line 67, "hack" should be --back--.

Column 9, Line 60, "And" should be --and--.

Column 11, Line 64, "which s rotationally" should be --which is rotationally--.

Signed and Sealed this
Thirtieth Day of April, 2019

Andrei Iancu
*Director of the United States Patent and Trademark Office*